United States Patent
Keegan et al.

(10) Patent No.: US 10,178,120 B1
(45) Date of Patent: Jan. 8, 2019

(54) METHOD FOR DETERMINING CONTAGION DYNAMICS ON A MULTILAYER NETWORK

(71) Applicant: HRL Laboratories, LLC, Malibu, CA (US)

(72) Inventors: Matthew S. Keegan, Boston, MA (US); Kang-Yu Ni, Calabasas, CA (US); Tsai-Ching Lu, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 214 days.

(21) Appl. No.: 15/217,393

(22) Filed: Jul. 22, 2016

Related U.S. Application Data (60) Provisional application No. 62/195,979, filed on Jul. 23, 2015.

(51) Int. Cl.
*H04L 29/06* (2006.01)

(52) U.S. Cl.
CPC ........ *H04L 63/1433* (2013.01); *H04L 63/145* (2013.01); *H04L 63/1441* (2013.01)

(58) Field of Classification Search
None
See application file for complete search history.

(56) References Cited

U.S. PATENT DOCUMENTS

| | | | | |
|---|---|---|---|---|
| 7,743,419 B1 * | 6/2010 | Mashevsky | ........... | G06F 21/552 713/187 |
| 2006/0090205 A1 * | 4/2006 | Ellis | ....................... | G06F 21/562 726/25 |
| 2013/0318027 A1 * | 11/2013 | Almogy | ................. | G16H 50/80 706/52 |

OTHER PUBLICATIONS

Bashan, Y. Berezin, S.V. Buldyrev, S. Havlin, The extreme vulnerability of interdependent spatially embedded networks. Nature Physics 9, pp. 667-672, (2013).

S.V. Buldyrev, R. Parshani, G. Paul, H.E. Stanley & S. Havlin, Catastrophic cascade of failures in interdependent networks. Nature 464, pp. 1025-1028 (2010).

D. Chakrabarti, Y. Wang, C. Wang, J. Leskovec, & C. Faloutsos, Epidemic thresholds in real networks. In ACM TISSEC: 10(4), 2008, pp. 1-26.

A. Ganesh, L. Massoulié, & D. Towsely, The effect of network topology on the spread of epidemics. In INFOCOM, 2005, pp. 1-12.

M. Halappanavar, S. Choudhury, E. Hogan, P. Hui, J.R. Johnson, I. Ray & L.B. Holder, Towards a network-of-networks framework for cyber security. In Proc. of ISI (IEEE 2013), pp. 106-108.

(Continued)

*Primary Examiner* — Malcolm Cribbs
*Assistant Examiner* — Andrew J Steinle
(74) *Attorney, Agent, or Firm* — Tope-McKay & Associates (57) ABSTRACT

Described is a system for predicting temporal evolution of contagions on multilayer networks. The system determines a functional epidemic threshold for disappearance of a contagion on a multilayer network model according to a score value $s=\lambda\beta/\delta$, where $\lambda$ corresponds to an adjacency matrix of the first layer of the multilayer network model, $\beta$ represents a spread rate of the contagion, and $\delta$ represents a recovery rate. A prediction of future behavior of the contagion on the multilayer network model using the functional epidemic threshold is output and utilized to inform decisions regarding connectivity within a multilayer network in order to prevent spread of the contagion on a multilayer network.

15 Claims, 8 Drawing Sheets

(56) References Cited

OTHER PUBLICATIONS

X. Huang, S. Shao, H. Wang, S.V. Buldyrev, H.E. Stanley, S. Havlin, The robustness of interdependent clustered networks. Europhys. Lett. 101, pp. 18002-p1-18002-p6 , (2013).
J.O. Kephart, S.R. White, Directed-graph epidemiological models of computer viruses. In Proc. of Symposium on Research in Security and Privacy (IEEE 1991), pp. 343-359.
F.D. Sahneh, C. Scoglio & F. Chowdhury, Effect of coupling on the epidemic threshold in interconnected complex networks: A spectral analysis. In Proc. of ACC (IEEE 2013), pp. 2313-2318.
A. Saumell-Mendiola, M. A. Serrano, M. Boguñá, Epidemic spreading on interconnected networks. Phys. Rev. E 86, pp. 026106-1-026106-4, (2012).
C.M. Schneider, N. Yazdani, N.A.M. Araujo, S. Havlin, H.J. Hermann. Towards designing robust coupled networks. Scientific Reports 3, 1969 (2013), pp. 1-7.
R. Vida. J. Galeano & S. Cuenda, Vulnerability of multi-layer networks under malware spreading. arXiv:1310.0741v2 [physics.soc-ph]Oct. 3, 2013, pp. 1-5.
H. Wang, Q. Li, G. D'Aqostino, S. Havlin, H.E. Stanley & P. Van Mieghem, Effect of the interconnected network on the epidemic threshold. Phys. Rev. E 88, pp. 022801-1-022801-13. (2013).
Hethcote, Herbert W. The mathematics of infectious diseases. SIAM review 42.4 (2000): pp. 599-653.
Björck, Ake. Numerical methods for least squares problems. Siam. 1996, pp. 165-170.

\* cited by examiner

METHOD FOR DETERMINING CONTAGION DYNAMICS ON A MULTILAYER NETWORK

CROSS-REFERENCE TO RELATED APPLICATIONS

This is a Non-Provisional patent application 62/195,979, filed in the United States on Jul. 23, 2015, entitled, "A Method for Determining Contagion Dynamics on a Multi-layer Network," the entirety of which is hereby incorporated by reference.

BACKGROUND OF INVENTION

(1) Field of Invention

The present invention relates to a system for predicting the likelihood of epidemic behavior of a contagion and, more particularly, to a system for predicting the likelihood of epidemic behavior of a contagion given the properties of a multilayer network.

(2) Description of Related Art

Computer viruses have been modeled as time-variant contagion processes, such as models of spreading contagious diseases on social networks, since the late 1980's. Previous work has focused on finding epidemic thresholds that describe the long-term behavior of the contagion. Some approaches have considered finding thresholds that describe the probability of cascading failures (see the List of Incorporated Literature References, Literature Reference Nos. 1 and 2) and threshold dynamics that describe the probability of epidemics reaching an endemic state on heterogeneous inter-connected networks (see Literature Reference Nos. 8, 9, and 12). Many of these other works are motivated by applications in failures of power grids and the spread of infectious diseases among inter-connected heterogeneous population groups.

Additionally, the recent work of Vida et al. (see Literature Reference No. 11) which considers similar network epidemic dynamics to the work described in Literature Reference Nos. 8, 9, and 12 was applied to the spread of malware, including a social network layer on which the malware can be spread (e.g., through email). However this work does not take into account cascading failure dynamics.

Current techniques for analyzing epidemic thresholds for multilayer networks use statistics-based methods. Moreover, they tend to be reactive as opposed to proactive. These methods have shown to be somewhat successful, and as a result, the success of current methods serves as a hurdle to develop breakthrough technologies. The tools that malicious agents use have become ever more sophisticated. A new set of tools must be developed to deal with these threats.

Thus, a continuing need exists for a network model that describes the spread of a virus over a physical computer network, and a method to predict the likelihood of epidemic behavior of such a contagion given the properties of the network.

SUMMARY OF INVENTION

The present invention relates to a system for predicting the likelihood of epidemic behavior of a contagion and, more particularly, to a system for predicting the likelihood of epidemic behavior of a contagion given the properties of a multilayer network. The system comprises one or more processors and a memory having instructions such that when the instructions are executed, the one or more processors perform multiple operations. The system determines a functional epidemic threshold for disappearance of a contagion on a multilayer network model having a first layer and a second layer, comprised of a plurality of nodes, according to a score value $s=\lambda\beta/\delta$, where $\lambda$ corresponds to an adjacency matrix of the first layer of the multilayer network model, $\beta$ represents a spread rate of the contagion, and $\delta$ represents a recovery rate. A prediction of future behavior of the contagion on the multilayer network model using the functional epidemic threshold is output.

In another aspect, a connectivity protocol based on the prediction of future behavior of the contagion is initiated in order to prevent spread of the contagion.

In another aspect, the system determines a boundary of a region in a $(s,m)$ parameter space where the contagion disappears with a high probability, where m denotes an average number of edges per node in the multilayer network.

In another aspect, the boundary of the region is described by a hyperbolic function $m=f(s)$.

In another aspect, the connectivity protocol makes automated recommendations for at least one of isolating an infected node in the multilayer network and removing edges in the multilayer network.

In another aspect, the functional epidemic threshold is utilized to assess robustness of an existing multilayer network and alter the existing multilayer network to make it more robust to contagion epidemics.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a system for predicting the likelihood of epidemic behavior of a contagion and, more particularly, to a system for predicting the likelihood of epidemic behavior of a contagion given the properties of a multilayer network. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of incorporated literature references as used in the description is provided. Next, a description of various principal aspects of the present invention is provided. Following that is an introduction that provides an overview of the present invention. Finally, specific details of the present invention are provided to give an understanding of the specific aspects.

(1) List of Incorporated Literature references

The following references are incorporated and cited throughout this application. For clarity and convenience, the references are listed herein as a central resource for the reader. The following references are hereby incorporated by reference as though fully included herein. The references are cited in the application by referring to the corresponding literature reference number, as follows:

1. Bashan, Y. Berezin, S. V. Buldyrev, S. Havlin, The extreme vulnerability of interdependent spatially embedded networks. *Nature Physics* 9, 667 (2013).
2. S. V. Buldyrev, R. Parshani, G. Paul, H. E. Stanley & S. Havlin, Catastrophic cascade of failures in interdependent networks. *Nature* 464, 1025-1028 (2010).
3. D. Chakrabarti, Y. Wang, C. Wang, J. Leskovec, & C. Faloutsos, Epidemic thresholds in real networks. In *ACM TISSEC*, 10(4), 2008.
4. A. Ganesh, L. Massoulié, & D. Towsely, The effect of network topology on the spread of epidemics. In *INFOCOM*, 2005.
5. M. Halappanavar, S. Choudhury, E. Hogan, P. Hui, J. R. Johnson, I. Ray & L. B. Holder, Towards a network-of-networks framework for cyber security. In *Proc. of ISI* (IEEE 2013), pp. 106-108.
6. X. Huang, S. Shao, H. Wang, S. V. Buldyrev, H. E. Stanley, S. Havlin, The robustness of interdependent clustered networks. *Europhys. Lett.* 101, 18002 (2013).
7. J. O. Kephart, S. R. White, Directed-graph epidemiological models of computer viruses. In *Proc. of Symposium on Research in Security and Privacy* (IEEE 1991), pp. 343-359.
8. F. D. Sahneh, C. Scoglio & F. Chowdhury, Effect of coupling on the epidemic threshold in interconnected complex networks: A spectral analysis. In *Proc. of ACC* (IEEE 2013), pp. 2313-2318.
9. A. Saumell-Mendiola, M. A. Serrano, M. Boguñá, Epidemic spreading on interconnected networks. *Phys. Rev. E* 86, 026106 (2012).
10. C. M. Schneider, N. Yazdani, N. A. M. Araujo, S. Havlin, H. J. Herrmann. Towards designing robust coupled networks. *Scientific Reports* 3, 1969 (2013).
11. R. Vida, J. Galeano & S. Cuenda, Vulnerability of multi-layer networks under malware spreading. arXiv: 1310.0741 v2.
12. H. Wang, Q. Li, G. D'Agostino, S. Havlin, H. E. Stanley & P. Van Mieghem, Effect of the interconnected network on the epidemic threshold. *Phys. Rev. E* 88, 022801 (2013).
13. Hethcote, Herbert W. The mathematics of infectious diseases. *SIAM review* 42.4 (2000): 599-653.
14. Björck, Ake. Numerical methods for least squares problems. *Siam*, 1996.

(2) Principal Aspects

Various embodiments of the invention include three "principal" aspects. The first is a system for determining contagion dynamics. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
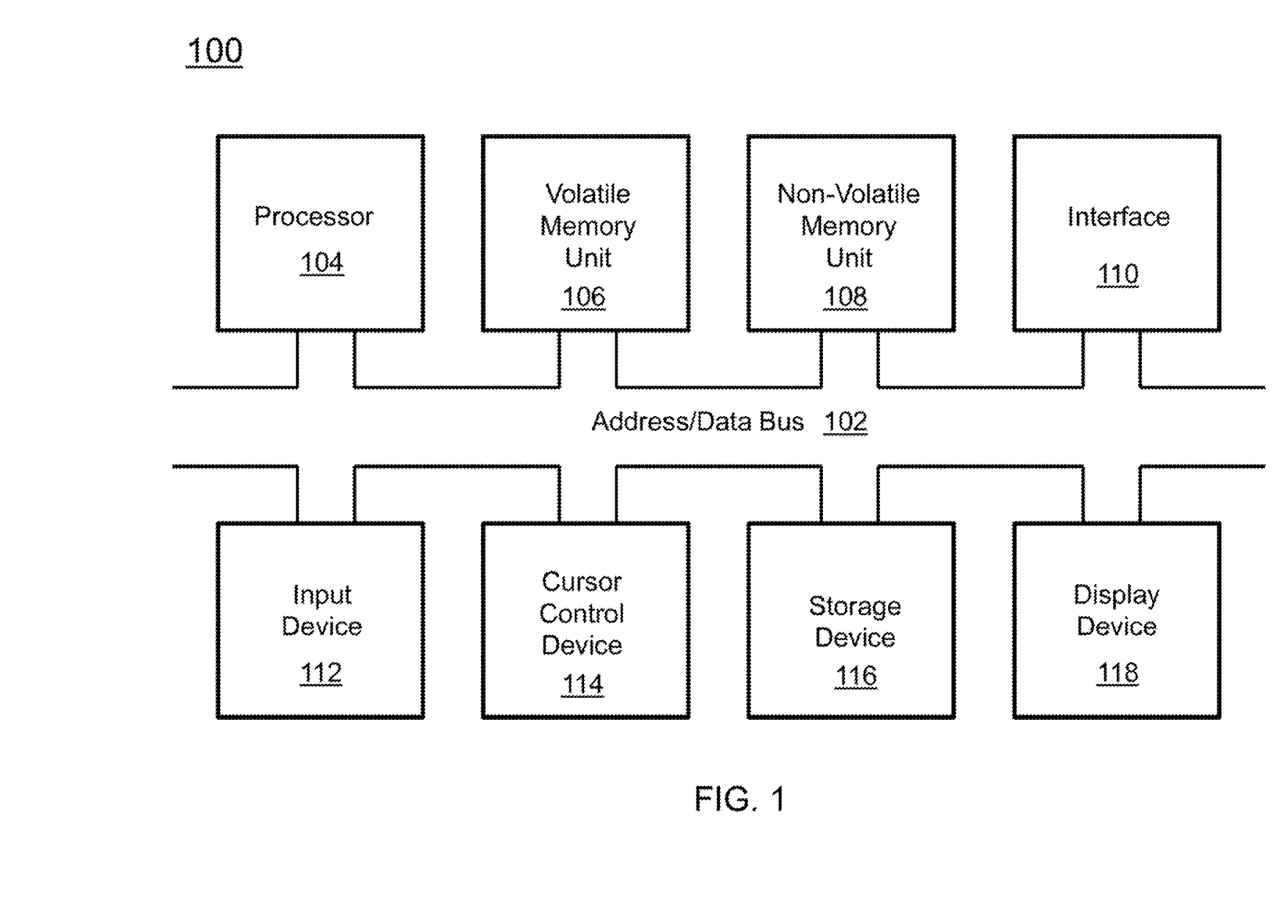
FIG. 1 is a block diagram depicting the components of a system for determining contagion dynamics according to some embodiments of the present disclosure.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
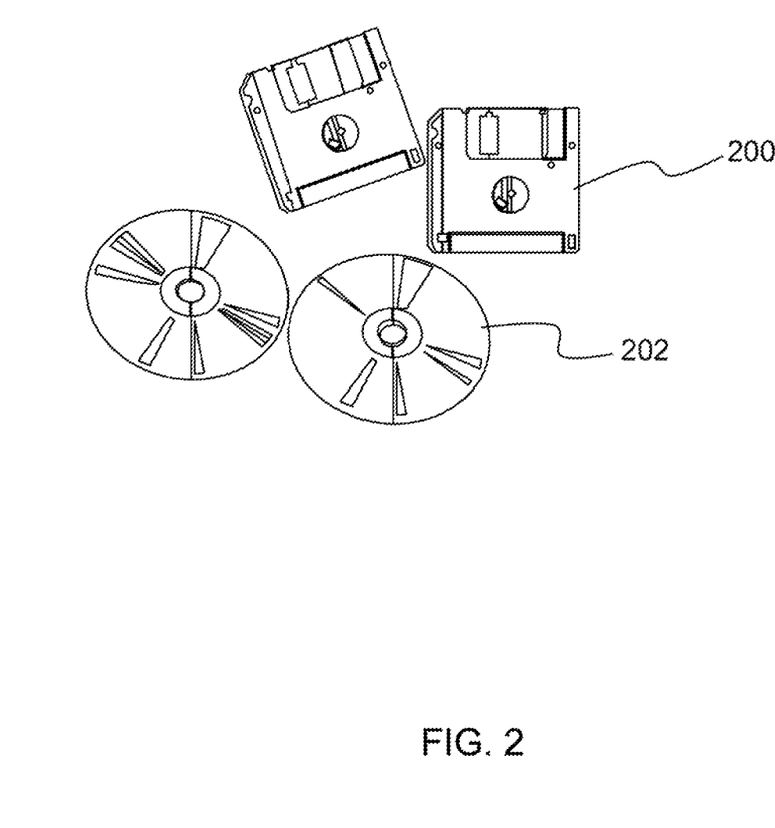
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

Computer viruses have been modeled as time-variant contagion processes, such as models of spreading contagious diseases on social networks, since the late 1980s. Specifically, Kephart and White (see Literature Reference No. 7) were the first to model a computer virus on a network as an SIS (Susceptible-Infected-Susceptible) or SIR (Susceptible-Infected-Resistant) discrete-time model. In an SIS model, each node on a network remains in a susceptible state until it is infected by one of its neighboring nodes. The infection of one node by an infected neighbor is a stochastic process in which, at a given time-point, the susceptible node has a probability β of obtaining the infection, independent from infection from another infected neighboring node. The probability β is called the spread rate of the infection. In addition, each node can be cured of the infection at any given time-point with probability δ, the cure rate of the contagion. In this case, the node returns to a susceptible state. The SIR model differs from the SIS model in that when an infected node is cured, it is placed in a resistant state, symbolizing an obtained immunity, in which it cannot be infected again in the future.

In an embodiment of the invention described herein, it is assumed that the rates described above are known. However, one can determine the rates of a computer virus contagion from historical data of that computer virus contagion. For the probability β, compute the probability that a susceptible (uninfected) node gets infected by a neighboring infected node at the next timestep. For δ, compute the probability that an infected node recovers at the next timestep.

The work of Kephart and White (see Literature Reference No. 7) and subsequent work has focused on finding epidemic thresholds that describe the long-term behavior of the contagion. The threshold determines parameter values β and δ that inform whether the contagion will disappear quickly off the network, or whether it will reach some steady state in which the number of nodes infected at any given time is at an approximate equilibrium. The threshold often depends on the topology of the network. A network manager can use the knowledge of these thresholds to take network-wide precautions to prevent large virus outbreaks.

Only recently have security researchers begun to study how the full structure of a network may inform of the consequences of a virus on the network. For instance, in the work described in Literature Reference No. 5, the authors propose a multi-layer network topology that incorporates the physical connections of the network, the dependence structure of applications on the network, and an overlaying social network (describing how users of the network communicate) as separate, but inter-connected, layers. In this disclosure, a model using a multi-layer network to describe the proper functioning of a computer network under attack from a malicious virus is described. Using this topology, a technique to accurately determine a functional epidemic threshold is demonstrated, as described in further detail below.

Current approaches to installing antivirus/malware software and keeping the aforementioned software up to date only consider local behavior of a virus on each individual node. Thus, they only prescribe individual node-based preventative and proscriptive methods to deal with malicious viruses. Although there is academic literature published recently on epidemic thresholds and other interacting dynamics on multi-layer (or interconnected) networks, the dynamics described below are unique. Competitive approaches have considered finding thresholds that describe the probability of cascading failures (see Literature Reference Nos. 1 and 2) and threshold dynamics that describe the probability of epidemics reaching an endemic state on heterogeneous inter-connected networks (see Literature Reference Nos. 8, 9, and 12). Unlike these works, the present invention utilizes a unique contagion dynamic evolving on a single layer. However, the spread of the contagion interacts with a second layer similar to the cascading failure dynamic that restricts the evolution of the contagion.

Many of these other works are motivated by applications in failures of power grids and the spread of infectious diseases among inter-connected heterogeneous population groups. In contrast, the system according to embodiments of the present disclosure is motivated by computer virus applications spreading on realistic network topologies, which are accurately described by multi-layered networks. The fusion of network science and cyber-security has only recently been recognized as a powerful tool in protecting computer and communication networks from viruses and malware (see Literature Reference No. 5).

(4) Specific Details of Various Embodiments

Described herein is a model for describing contagion dynamics on multilayer networks, and a method to predict the likelihood of epidemic behavior of such a contagion given the properties of the network. The specific choice of this network model is made to realistically describe the spread of a virus over a physical computer network.

In one embodiment, the choice of a network model is the following: 1) an underlying physical layer that represents a set of bidirectional dependencies that determine the operating behavior of each node, and 2) a communication layer that defines how each node spreads application data. An assumption of the model is that if a node is disconnected from a significant component of the physical layer, then it loses power and can no longer communicate with its neighbors on the communication layer. It is further assumed that a malicious contagion process spreads through the communication layer and that if a node is infected, its connections are removed from the physical layer during the period of the node's infection.

The present invention comprises tools for prediction of the long-term temporal evolution of contagions on multilayer networks, such as viruses on computer networks. A network manager can use this information to take informed network-wide steps, rather than traditional methods that prescribe individual node-based solutions, to prevent large virus outbreaks, which can take down the proper functioning of a computer network. For instance, a network could be designed or modified such that λ of the network is small enough to decrease the score value s (to keep the contagion size small) and, at the same time, meet the desired functioning of the network. A non-limiting example of a design alteration/modification to reduce λ is to remove edges from the network. Current approaches only consider local behavior of a virus on each individual node. Thus, they only prescribe individual node-based preventative and proscriptive methods to deal with malicious viruses.

(3.1) Model

Figure 3:
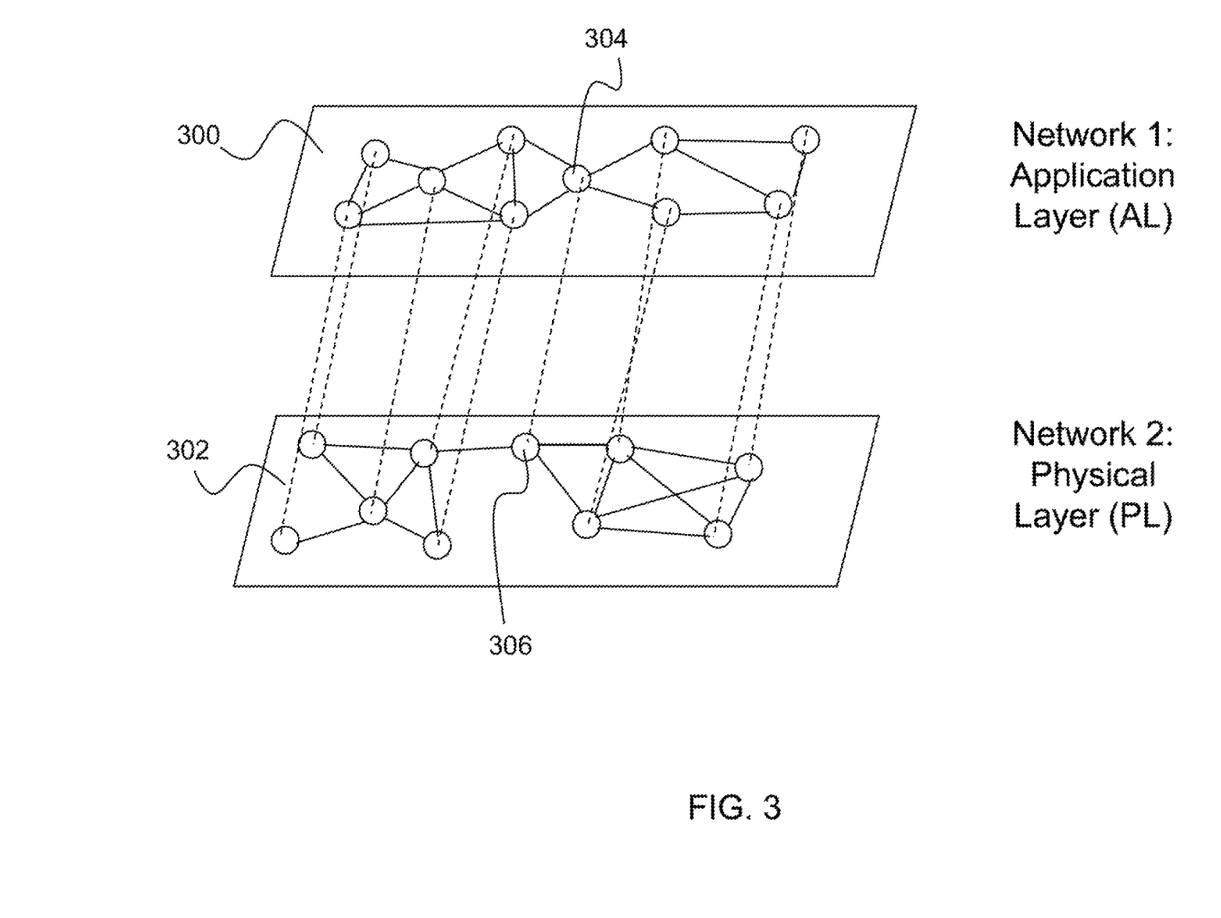
FIG. 3 is an illustration of a multi-layer network structure according to some embodiments of the present disclosure.

FIG. 3 depicts an illustration of an example multi-layer network structure. The network shown in FIG. 3 demonstrates the class of graph topologies considered. The network comprises two layers 300 and 302 with a one-to-one set of connections (represented by dashed lines) between the nodes (represented by circles) on each layer 300 and 302. The first layer 300, the Application Layer, defines how the applications of the network functionally relate to each other. The edges of the first layer 300 represent bidirectional dependencies of the applications of the network. These edges also represent how data is communicated across the network. The second layer 302, the Physical Layer, represents a communication, or power, layer. On the first layer 300, it is assumed that there is a virus or contagion process evolving at each time step. Whenever a node (e.g., 304) is infected on the first layer 300, it is assumed that the corresponding node (e.g., 306) in the second layer 302 is switched off and that communication or power can no longer pass through that node. The node (e.g., 306) is essentially removed from the second layer 302 while the corresponding node (e.g., 304)

on the first layer 300 is infected. In addition, it is assumed that if a node (e.g., 304) on the first layer 300 loses contact with a significant 'on' connected node (e.g., 306) of the second layer 302, it is also switched off. If a node (e.g., 306) is switched off, its corresponding node (e.g., 304) on the first layer 300 can no longer be communicated with on the first layer 300.

Figure 4:
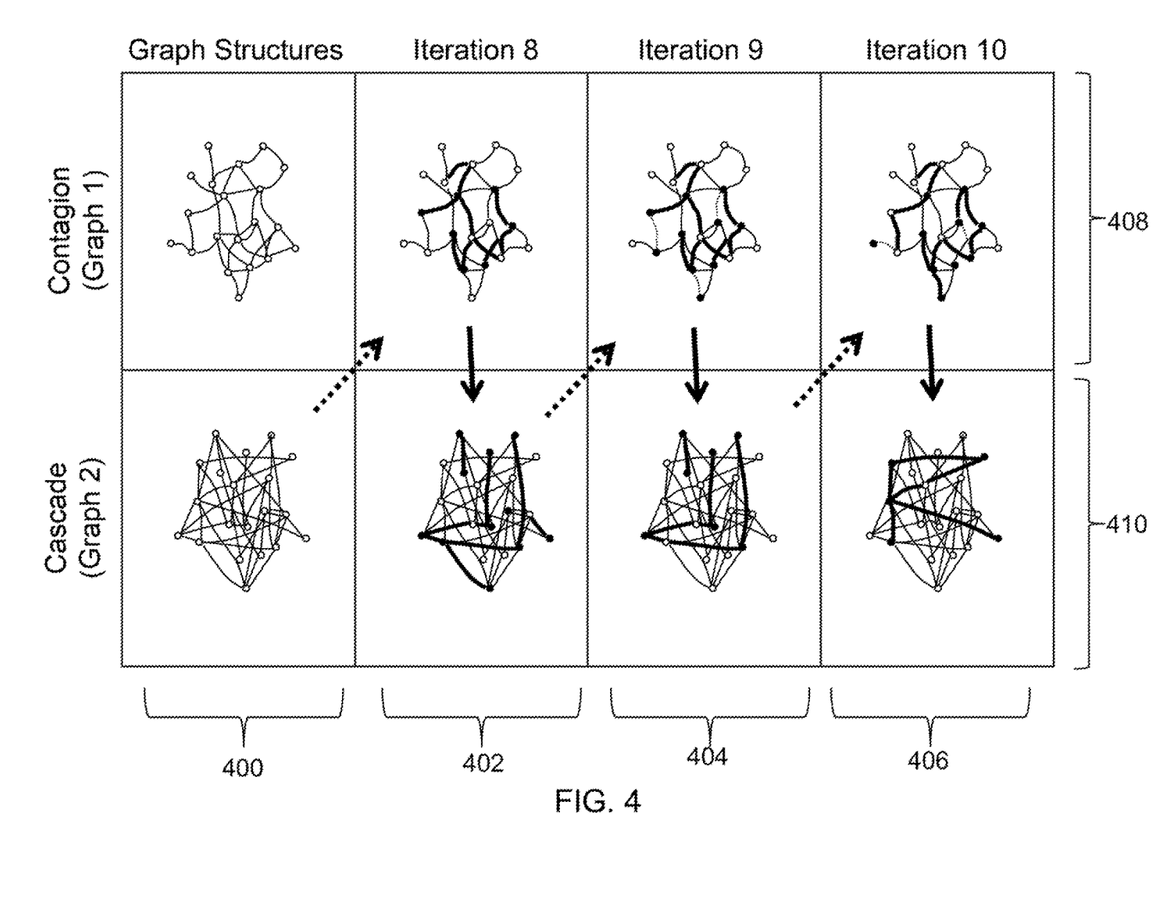
FIG. 4 is an illustration of a discrete-time contagion evolution according to some embodiments of the present disclosure.

The dynamics are graphically demonstrated in FIG. 4. The first column 400 displays the network topology of each layer. Column 2 (element 402), column 3 (element 404), and column 4 (element 406) display the status of the evolving dynamic on each layer for consecutive iterations. On the first row 408 (corresponding to the first layer 300), the filled circles represent the currently infected nodes and the unfilled circles represent the currently susceptible nodes. Edges depicted as dashed lines are the edges along which an infection has just spread. Edges depicted as bolded lines are those along which an infection has spread on a previous infection. On the second row 410 (corresponding to the second layer 302), the filled circles and bolded lines represent nodes and edges corresponding to the largest connected component on the second layer 302. The component consists of nodes that have susceptible status on the first layer.

At each discrete time step, the dynamics adhere to the following steps. Firstly, on the first layer the contagion evolves stochastically in the manner of an SIS (Susceptible-Infected-Susceptible) contagion (see Literature Reference No. 13 for a description of an SIS contagion), except that the only nodes that are susceptible to infection are the nodes that are 'on' in the second layer. In this step, each infected node infects a neighboring susceptible node with probability $\beta$. In other words, nodes that are not members of a large connected component (of size O(log(n)) are considered 'off' and cannot be infected.

Another perspective to the dynamics on the first layer is that the contagion is spreading on a non-static graph in which, at each time-point, certain edges are removed due to factors independent from the structure of the first layer. Secondly, before the beginning of the subsequent discrete time step, each infected node recovers to a susceptible state with probability $\delta$. Finally, on the second layer, the large connected components of the uninfected nodes are found, which will then be used in the following time step to determine the evolution of the contagion.

The layers exhibit interacting dynamics in a similar manner to the cascading failures model described in Literature Reference No. 2. The similarity lies in the fact that a portion of the second layer 'fails' due to the influence of the first layer. However, instead of a set of symmetric failures on each layer, the size of the largest connected component on the second layer affect the evolution of the contagion on the first layer.

(3.2) Theory

Contagion processes on finite single-layer networks are well studied and fairly well understood. Of particular interest is the existence of an epidemic threshold defined as a value $\tau$ such that if $\beta/\delta < \tau$ with probability measure one, the infection will die out quickly over time. Dying out quickly means that the length of the lifetime of the contagion before it disappears is O(log n), where n is the number of nodes in the network. In particular, the work disclosed in Literature Reference Nos. 3 and 4 is noted, which provide the result that $\tau < 1/\lambda$ and in the case for some graph approximations $\tau = 1/\lambda$, where $\lambda$ is the largest eigenvalue of the adjacency matrix A of the network. The adjacency matrix of a network is a matrix representation of the node-to-node connections in the network (i.e., edges of the graph corresponding to the network), where an element $a_{ij}$ of an adjacency matrix A represents a connection between an i-th node and a j-th node of the network. For example, a j-th entry in the i-th row of the adjacency matrix A may be '1' if there is a node-to-node connection between the i-th node and a j-th node, and otherwise is '0'. In another example, the j-th entry may have a positive value greater than one to indicate both a connection and a strength of the connection between the i-th node and the j-th node. In the case of network-of-network and multilayer networks, very little theory of epidemic thresholds is known.

(3.3) Approach

In one embodiment, an aim of the present invention is to find a functional epidemic threshold model for the multilayer model described above. The purpose of the functional epidemic threshold model is to predict whether a contagion will die out quickly with high confidence. For a single-layer network, define the score as $s = \lambda\beta/\delta$. This definition is extended to the multilayer network according to the embodiments of the present disclosure, where $\lambda$ corresponds to the adjacency matrix of the first layer. An adjacency matrix is a square matrix used to represent a graph. The dimension of the adjacency is n by n, where n is the number of nodes in the graph. The entries of the matrix indicate whether a pair of nodes are connected with an edge or not in the graph.

The theory described in section (3.2) informs one that for values $s < 1$, a single-layer contagion process will disappear quickly. It has been observed in practice that this inequality is quite loose and that a contagion will always disappear for certain values of s greater or equal to 1. This is certainly true for the multilayer model according to embodiments of the present disclosure. In addition, it should seem intuitive that the survivability of the contagion also depends on the connectivity of the second network, since the existence and size of a connected component on that network interactively determines the number of nodes that can be infected at any given time. It has been observed that by altering the connectivity distribution of the second layer, the values of s for which the contagion will never survive will change.

These observations lead to the following hypothesis: one can compute a functional epidemic threshold for a given multilayer network that informs one of the near certainty of the disappearance of a contagion (given the corresponding value of s and the connectivity of each network). Short of theoretical results, the functional model is determined by running simulations on networks of the appropriate topology and determining for which values of $\lambda$, $\beta$ and $\delta$ one observes that the contagion will disappear with probability >90%. Then, a determination is made whether an analytic fit can be found in the parameter space of values for $\lambda$, $\beta$ and $\delta$ to describe the boundary of the region where the contagion disappears with probability >90%. This can serve as an epidemic threshold function, which can be used to determine the future behavior of a given contagion.

Note that this same process can also be used to determine a region in the parameter space in which a contagion will survive with certain high probability. However, that computation is analogous to the method of finding a functional epidemic threshold for contagion disappearance, as described here.

(3.4) Experimental Results

Simulations were run for multilayer networks in which each layer is a random graph; namely, that the existence of an edge between any given two nodes is determined by an independent and identical Bernoulli distribution. Such networks are also known as Erdos-Renyi graphs. In the simulations, the initial observation was that the region of contagion disappearance is dependent on the relative connectivities of the two layers. This is demonstrated in FIGS. 5A and 5B. Therefore, initially the relative connectivity of the layers was fixed and a functional epidemic threshold for that ratio was determined. Once the connectivity for layer 1 was fixed, designated by the average number of edges per node m, a multilayer graph with the designated connectivity distributions was generated for both layers.

Figure 5A:
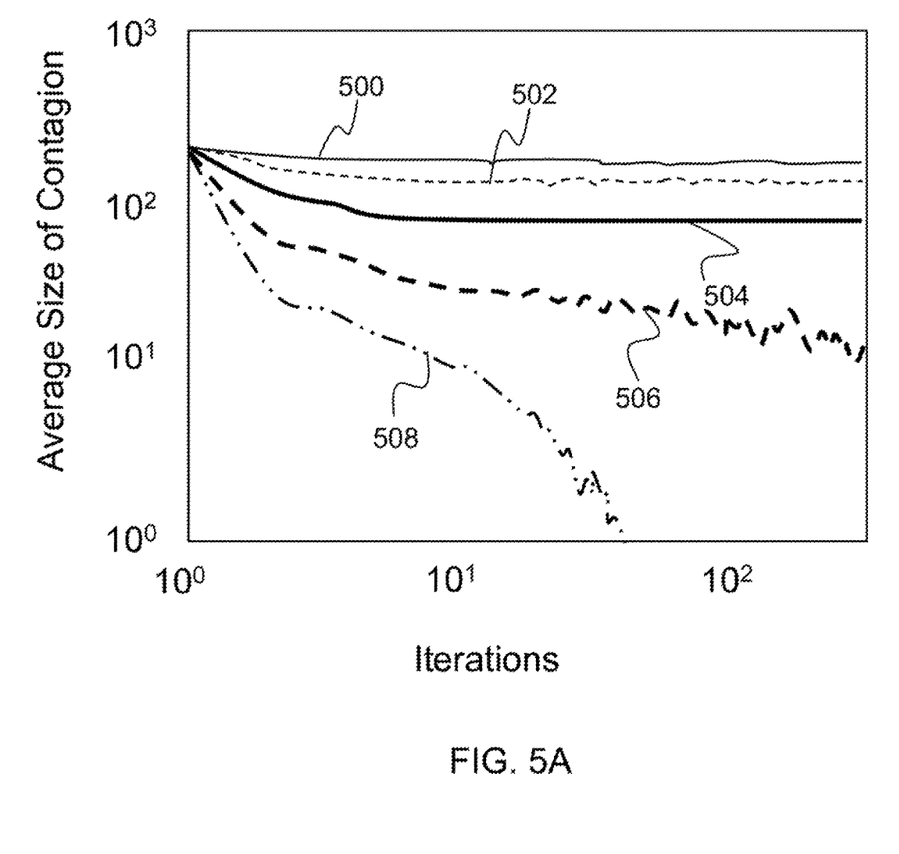
FIG. 5A is a plot illustrating the average contagion size of the contagion evolving when each layer has the same average connectivity according to some embodiments of the present disclosure.
Figure 5B:
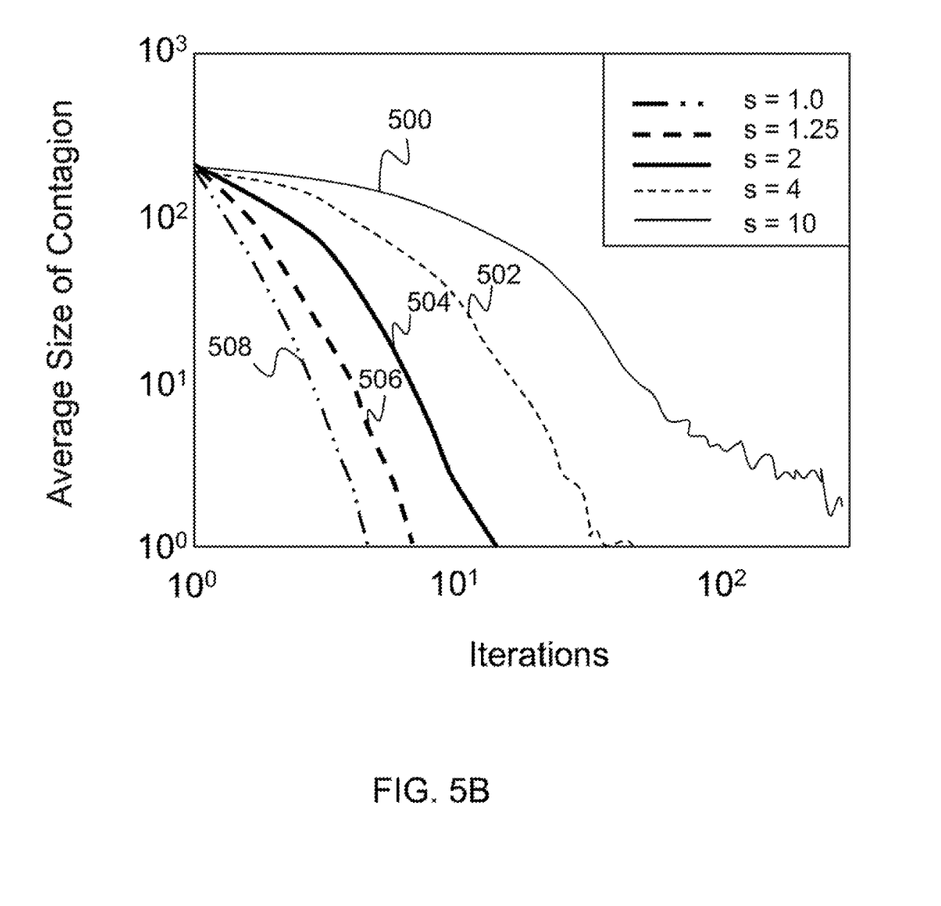
FIG. 5B is a plot illustrating the average contagion size of the contagion evolving when the second layer has a quarter of the connectivity of the first layer according to some embodiments of the present disclosure.

Specifically, FIGS. 5A and 5B depict examples of the multi-layer contagion process for different connectivity relationships between the two layers. Each of the two plots shows the average contagion size of the contagion evolving on the first layer for five different choices of the score s. FIG. 5A shows results for when each layer has the same average connectivity, while FIG. 5B shows results for when the second layer has a quarter of the connectivity of the first layer. It is clearly shown that by decreasing the connectivity of the second layer (as in FIG. SB), the expected lifetime of the contagion can be drastically altered. At the initial state, all nodes were infected. For each of the plots in FIGS. 5A and 5B, curves 500 represent s=10, curves 502 represent s=4, curves 504 represent s=2, curves 506 represent s=1.25, and curves 508 represent s=1.

It was additionally observed that the disappearance of a contagion process depends on the score value s=$\lambda\beta/\delta$. $\lambda$ was computed from the graph generated for layer 1, and the recovery rate $\delta$ (e.g., 0.5) was fixed. Thus, to obtain a chosen value for s, the spread rate $\beta$ (0.5) is varied.

For each choice of m and s, 1000 multilayer networks were generated, and a simulation of the multilayer contagion process was run on each generated network. The initial state of each node was set as infected. Each contagion was allowed to evolve until a maximum number of iterations had been computed (which was set at 10,000 iterations), and the proportion of surviving contagions was observed.

A number of appropriate parameter searches were conducted using the above simulation approach to find a number of points designating the boundaries of the region of contagion disappearance in the (s,m)-parameter space. Significantly, it was found that the boundary of this region can be described accurately by a hyperbolic function m=f(s) of the form:

$$f(s) = x_1 + \frac{x_2}{x_3 + s}.$$

The coefficients of this equation, $x_i$ for i=1, 2, 3, are fit using weighted least squares (see Literature Reference No. 14 for a description of weighted least squares). The value of s is set as the weight to prevent the points found for large m to skew fit for the points with large values of s. The data points are found through simulation results (such as those depicted in FIG. 6). Since the value of s is set as the weight, and since f(s) is large when s is small, large in values are weighted less.

Figure 6:
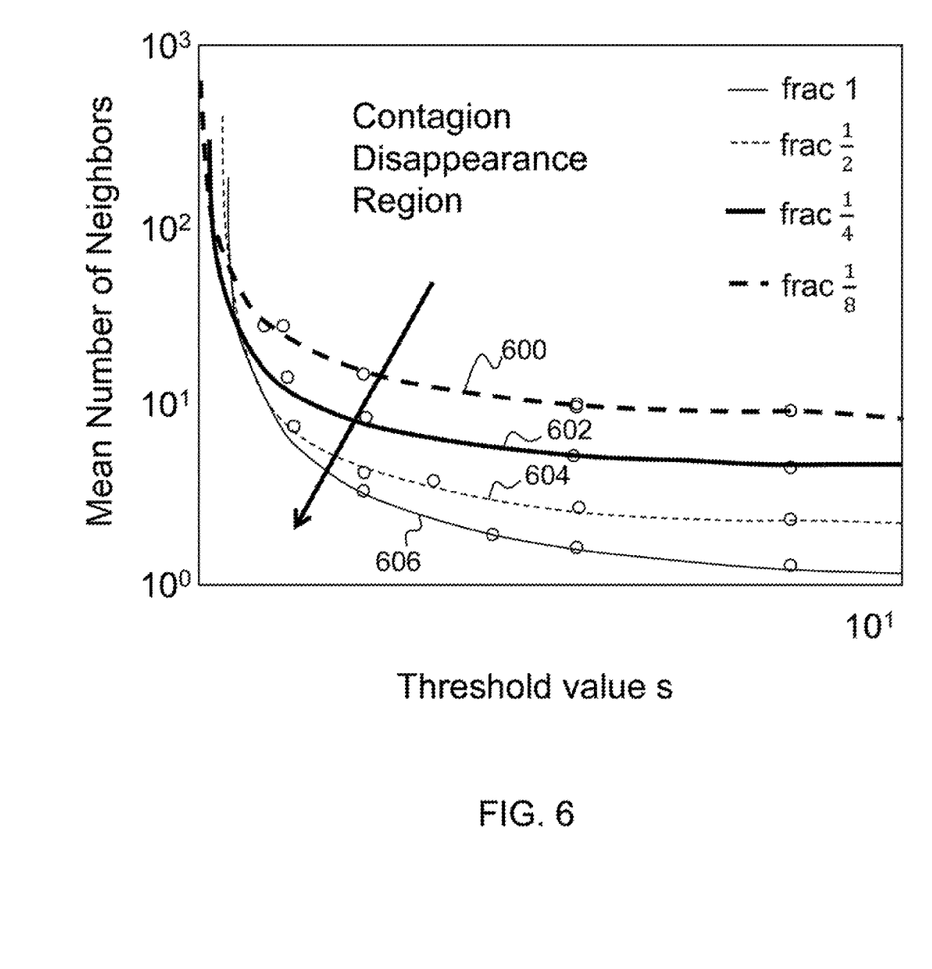
FIG. 6 is a plot illustrating instances of the functional hyperbolic fits that represent the boundary of the region of high probability of contagion disappearance according to some embodiment of the present disclosure.

In FIG. 6, the fitting for four connectivity ratios is depicted. Specifically, FIG. 6 shows instances of the functional hyperbolic fits that represent the boundary of the region of high probability of contagion disappearance. Each set of plots represents the fraction of connectivity of the second layer with respect to the first layer, displayed numerically in the legend (curve 600 represents ⅛ connectivity; curve 602 represents ¼ connectivity; curve 604 represents ½ connectivity; and curve 606 represents equal connectivity of the second layer with respect to the first layer). The horizontal axis represents the score value, and the vertical axis represents the average connectivity of the first layer. Each circle represents a set of parameters selected as a representative boundary point, and each line represents the hyperbolic fit f through the values of the corresponding circles. Below each curve is the region of high probability that the contagion dies out. The more connected the network, the less likely that the contagion dies out.

Figure 7:
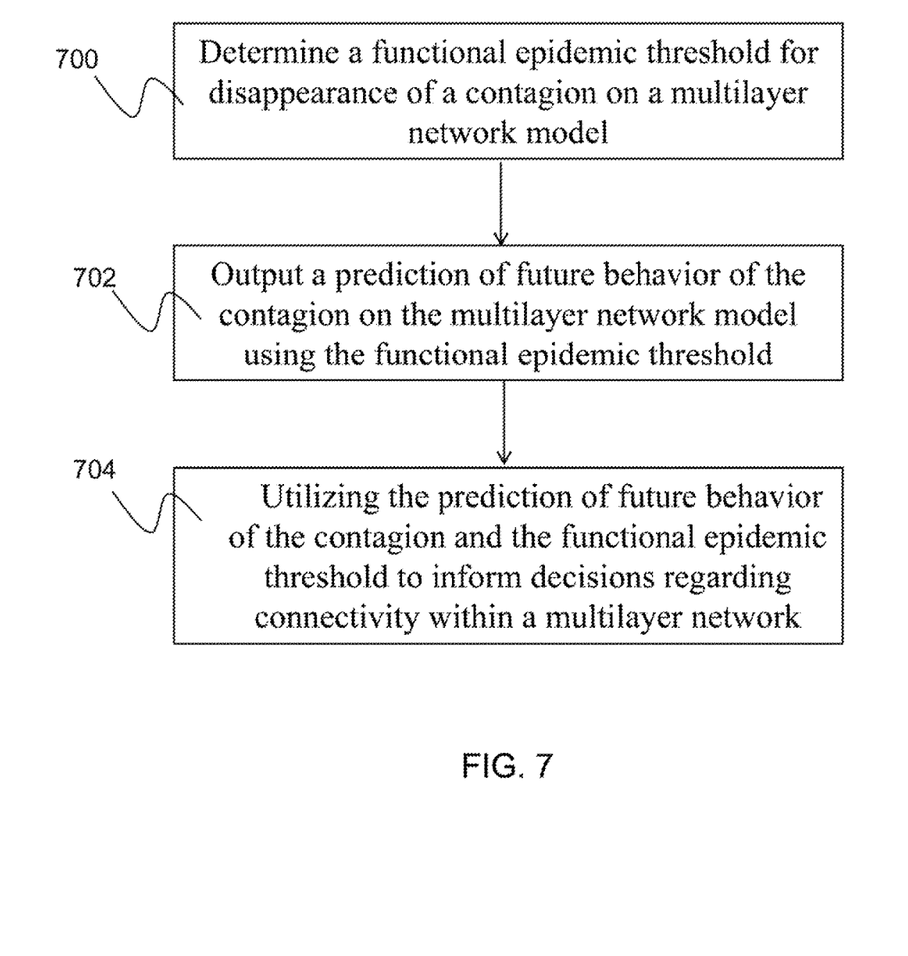
FIG. 7 is a flow diagram illustrating a system for predicting the likelihood of epidemic behavior of a contagion according to some embodiments of the present disclosure.

FIG. 7 is a flow diagram illustrating a system for predicting the likelihood of epidemic behavior of a contagion according to some embodiments of the present disclosure. As described above, in a first operation 700, the functional epidemic threshold is determined for a multilayer network model. In a subsequent operation 702, a prediction of future behavior (i.e., the evolution) of the contagion on the multilayer network model is output. In a following operation 704, the functional epidemic threshold and the prediction of future behavior are utilized by a user (analyst) to make decisions regarding connectivity of a real multilayer network.

The functional threshold according to embodiments of the present disclosure may be used to inform decisions of how to construct real networks and/or how to control the connectivity of networks (e.g., mobile networks) in order to avoid computer virus outbreaks. Some interesting research has recently been conducted on assessing the robustness of networks and dynamically altering them to make them more robust to epidemics. For example, see Literature Reference Nos. 6 and 10. The results described herein would provide valuable input to algorithms designed for this purpose.

In a final operation, the system initiates a connectivity protocol based on the prediction of future behavior of the contagion in order to prevent spread of the contagion. For instance, an infected node (or nodes) of the network may need to be isolated by electronically severing all communication edges with the infected node(s). Alternatively, if an infected node is mission-critical and cannot be isolated from the network, the infected node (or nodes) can be isolated in a quarantine network with heavily restricted network access in a separate connectivity protocol. The operations described above can be done as soon as a computer virus is detected. By removing edges in the second layer, it limits the spread of the computer virus. The operations above could also be applied to network designs. The more the connections are in the second layer (i.e., $\lambda 0$ becomes larger), the more efficient the functionality of the network can attain. However, to be robust to virus attacks, the $\lambda$ needs to be small enough. The connectivity protocol can be initiated to remove edges in the second layer to make sure the network is sufficiently robust.

For cascading failures in a vehicle system, one can consider deploying "smart switching" or a "circuit breaker" to connect and disconnect links or connect and disconnect certain links between communication and control networks of on-board vehicle electrical systems. The system described herein can be configured to do this automatically. For instance, the present invention can employ existing methods that remove network edges to alter the $\lambda$.

A customer could use the invention described herein by generating a graph, such as the one shown in FIG. 6, with defined parameters s (or $\beta$, $\lambda$, $\delta$) to find out the desired fraction in order to control a potential contagion. One can determine the rates of a computer virus contagion, rumor spread, etc. from historical data of the contagion spread. For $\beta$, compute the probability that a susceptible (uninfected) node gets infected by a neighboring infected node at the next timestep. For $\delta$, compute the probability that an infected node recovers at the next timestep. For λ, compute the largest eigenvalue of the adjacency matrix of the network.

There are multiple applications for the system and method described herein. Non-limiting examples for use of the present invention include vehicle health management, complex electronics, smart power grid, wireless network protection, social network analysis, social instability, supply-chain crisis management, and cyber security. Each of these examples can be modeled as a multilayer network, comprising a plurality of nodes, with an application layer and a physical layer that are interdependent.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for predicting temporal evolution of contagions on multilayer networks, the system comprising:
   one or more processors and a non-transitory memory having instructions encoded thereon such that when the instructions are executed, the one or more processors perform operations of:
      determining a functional epidemic threshold for disappearance of a contagion on a multilayer network model having a first layer and a second layer, comprised of a plurality of nodes, according to a score value $s=\lambda\beta/\delta$, where $\lambda$ corresponds to an adjacency matrix of the first layer of the multilayer network model, $\beta$ represents a spread rate of the contagion, and $\delta$ represents a recovery rate;
      outputting a prediction of future behavior of the contagion on the multilayer network model using the functional epidemic threshold; and
      initiating a connectivity protocol based on the prediction of future behavior of the contagion,
      wherein the connectivity protocol makes automated recommendations for preventing spread of the contagion.

2. The system as set forth in claim 1, wherein the one or more processors further perform an operation of determining a boundary of a region in a (s,m) parameter space where the contagion disappears with a high probability, where m denotes an average number of edges per node in the multilayer network.

3. The system as set forth in claim 2, wherein the boundary of the region is described by a hyperbolic function $m=f(s)$.

4. The system as set forth in claim 1, wherein the connectivity protocol makes automated recommendations for at least one of isolating an infected node in the multilayer network and removing edges in the multilayer network.

5. The system as set forth in claim 1, wherein the one or more processors further perform operations of:
   utilizing the functional epidemic threshold to assess robustness of an existing multilayer network; and
   altering the existing multilayer network to make it more robust to contagion epidemics.

6. A computer-implemented method for predicting temporal evolution of contagions on multilayer networks, comprising:
   an act of causing one or more processors to execute instructions stored on a non-transitory memory such that upon execution, the one or more processors perform operations of:
      determining a functional epidemic threshold for disappearance of a contagion on a multilayer network model having a first layer and a second layer, comprised of a plurality of nodes, according to a score value $s=\lambda\beta/\delta$, where $\lambda$ corresponds to an adjacency matrix of the first layer of the multilayer network model, $\beta$ represents a spread rate of the contagion, and $\delta$ represents a recovery rate;
      outputting a prediction of future behavior of the contagion on the multilayer network model using the functional epidemic threshold; and
      initiating a connectivity protocol based on the prediction of future behavior of the contagion,
      wherein the connectivity protocol makes automated recommendations for preventing spread of the contagion.

7. The method as set forth in claim 6, wherein the one or more processors further perform an operation of determining a boundary of a region in a (s,m) parameter space where the contagion disappears with a high probability, where m denotes an average number of edges per node in the multilayer network.

8. The method as set forth in claim 7, wherein the boundary of the region is described by a hyperbolic function $m=f(s)$.

9. The method as set forth in claim 6, wherein the connectivity protocol makes automated recommendations for at least one of isolating an infected node in the multilayer network and removing edges in the multilayer network.

10. The method as set forth in claim 6, wherein the one or more processors further perform operations of:
    utilizing the functional epidemic threshold to assess robustness of an existing multilayer network; and
    altering the existing multilayer network to make it more robust to contagion epidemics.

11. A computer program product for predicting temporal evolution of contagions on multilayer networks, the computer program product comprising:
    computer-readable instructions stored on a non-transitory computer-readable medium that are executable by a computer having one or more processors for causing the processor to perform operations of:
       determining a functional epidemic threshold for disappearance of a contagion on a multilayer network model having a first layer and a second layer, comprised of a plurality of nodes, according to a score value $s=\lambda\beta/\delta$, where $\lambda$ corresponds to an adjacency matrix of the first layer of the multilayer network model, $\beta$ represents a spread rate of the contagion, and $\delta$ represents a recovery rate;
       outputting a prediction of future behavior of the contagion on the multilayer network model using the functional epidemic threshold; and
       initiating a connectivity protocol based on the prediction of future behavior of the contagion,
       wherein the connectivity protocol makes automated recommendations for preventing spread of the contagion.

12. The computer program as set forth in claim 11, further comprising instructions for causing the one or more processors to further perform an operation of determining a boundary of a region in a (s,m) parameter space where the contagion disappears with a high probability, where m denotes an average number of edges per node in the multilayer network.

13. The computer program product as set forth in claim 12, wherein the boundary of the region is described by a hyperbolic function $m=f(s)$.

14. The computer program as set forth in claim 11, wherein the connectivity protocol makes automated recommendations for at least one of isolating an infected node in the multilayer network and removing edges in the multilayer network.

15. The computer program as set forth in claim 11, further comprising instructions for causing the one or more processors to further perform operations of:
  utilizing the functional epidemic threshold to assess robustness of an existing multilayer network; and
  altering the existing multilayer network to make it more robust to contagion epidemics.

* * * * *